Figure 1:
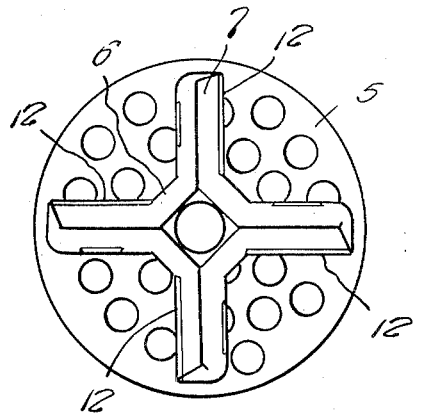

Dec. 3, 1929.    J. M. STIVERS    1,738,025
MEAT CHOPPER BLADE AND BLADE HOLDER

Filed May 20, 1927

Inventor
J. M. Stivers,

By Clarence A O'Brien
Attorney

Patented Dec. 3, 1929

1,738,025

UNITED STATES PATENT OFFICE

JAKE M. STIVERS, OF ENID, OKLAHOMA, ASSIGNOR TO THE BEST BLADE & HOLDER CO., OF OKLAHOMA CITY, OKLAHOMA, A COPARTNERSHIP COMPOSED OF L. J. MILBURN AND O. E. HILTON

MEAT-CHOPPER BLADE AND BLADE HOLDER

Application filed May 20, 1927. Serial No. 193,007.

The present invention relates to meat chopper blades and a blade holder therefor.

The prime object of the invention is to provide a combination of a holder with one or more blades and a wedge connection means therebetween, said connection wedging tangentially to the axis of rotation of the holder so as to be tightened when the device is in actual operation.

Another very important object of the invention resides in the provision of a device of this nature which is exceedingly simple in its construction, easy to manipulate, inexpensive to manufacture, and otherwise efficient and reliable in use.

With the above and other objects in view as will appear as the description proceeds, the invention resides in the novel features of construction hereinafter more fully described and claimed.

Figure 2:
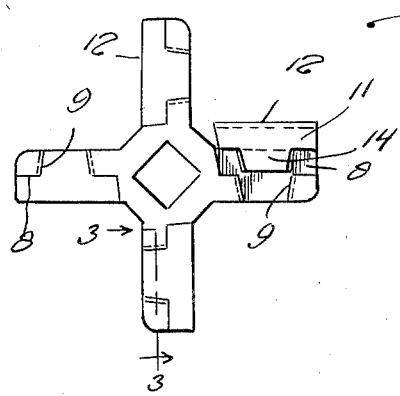
Figure 3:
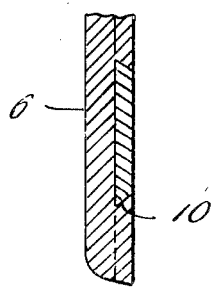

In the drawing:

Figure 1 is an elevation of a holder, blades and meat chopper plate assembled in proper relation to each other in accordance with this invention, Figure 2 is an elevation of the holder with the blades showing three of them in place and one removed, and Figure 3 is an enlarged detail section taken substantially on the line 3—3 of Figure 2.

Referring to the drawings in detail it will be seen that the numeral 5 denotes a meat chopper plate of conventional construction. The numeral 6 denotes the hub of the holder which has radiating therefrom a plurality of arms 7 the faces of which adjacent the plate 5 are formed with recesses 8 having wedge shaped extensions 9, the side walls of which are dove tailed as indicated to advantage at 10 in Figure 3.

A plurality of blades 11 are provided with cutting edges 12 and with wedge shaped extensions 14 on the opposite side to the edges 12. The side edges of the portion or extensions 14 are dove tailed as is also indicated at 10 in Figure 3. It will thus be seen that the blades may be positioned in the recesses with their extensions wedged in the extensions 9 and that this wedging action is tangential to the axis of rotation of the holder so that when the device is in operation the resistance offered to the blades by the meat being chopped will wedge the blades tightly in engagement with the arms of the holder thus preventing accidental displacement.

When the blades become dull they are removed and thrown away and new blades put in place thereof. I do not utilize any screws or springs in order to hold the blades in place as these blades wedge themselves solid into the holder as they revolve in the meat chopper. A little tap on the smaller end of the extension of each blade will loosen the blades from the recess so that it may be easily and quickly removed. The holder is provided with any suitable number of arms in which the blades are inserted and while the drawings show four it is to be understood that more or less may be used if desired.

It is thought that the construction, utility and advantages of this invention will now be quite apparent to those skilled in this art without a more detailed description thereof. It is apparent that changes in the details of construction may be resorted to without departing from the spirit or scope of the invention as hereinafter claimed or sacrificing any of its advantages.

Having thus described my invention, what I claim as new is:

In a meat chopper blade holder, a rotatable body, said body consisting of a hub and a plurality of radiating arms, each of said arms being reduced at one longitudinal edge portion and a channel extending at right angles from the reduced portion transversely across the arm, the edge portions of said channel being converged and dove-tailed to receive the wedge shaped shank of a blade member.

J. M. STIVERS.